Figure 1:
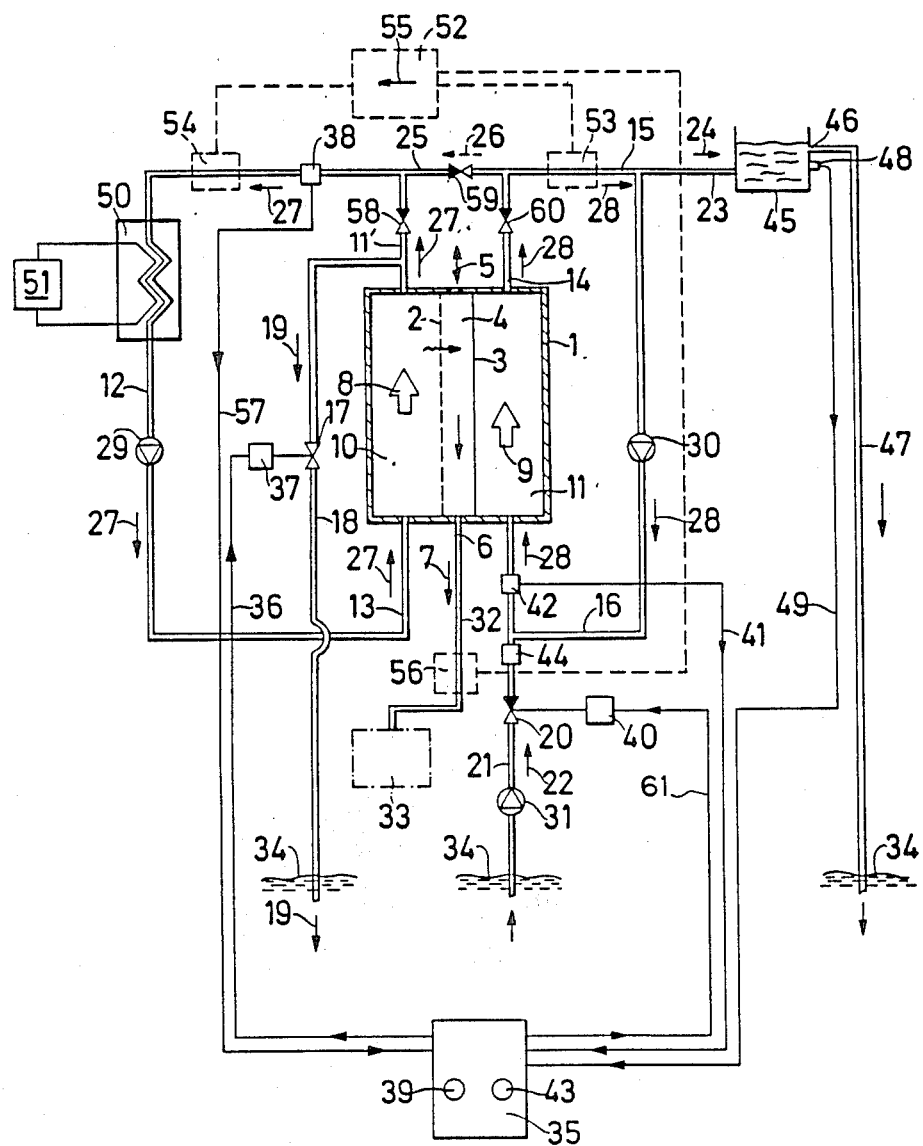

United States Patent [19]

Kjellander et al.

[11] Patent Number: 4,728,397
[45] Date of Patent: Mar. 1, 1988

[54] APPARATUS FOR DESALINATING SALT WATER BY MEMBRANE DISTILLATION

[75] Inventors: Nils Kjellander, Solna; Bo Rodesjö, Täby, both of Sweden

[73] Assignee: Svenska Utvecklings AB, Sweden

[21] Appl. No.: 44,503

[22] PCT Filed: Jun. 16, 1986

[86] PCT No.: PCT/SE86/00290
§ 371 Date: Mar. 3, 1987
§ 102(e) Date: Mar. 3, 1987

[87] PCT Pub. No.: WO87/00160
PCT Pub. Date: Jan. 15, 1987

[30] Foreign Application Priority Data

Jul. 4, 1985 [SE] Sweden .............................. 8503335

[51] Int. Cl.$^4$ ............................................ B01D 13/00
[52] U.S. Cl. .................................... 202/180; 202/195; 202/235; 203/2; 203/10; 203/DIG. 4; 203/DIG. 9; 203/DIG. 17; 203/DIG. 18; 159/28.1; 159/44; 159/DIG. 27; 159/DIG. 28
[58] Field of Search ............... 159/DIG. 27, DIG. 28, 159/43.1, 44, 901, 28.1; 203/1, 2, 10, DIG. 4, DIG. 17, DIG. 18, DIG. 19; 202/180, 195, 235, 160, 176, 206

[56] References Cited

U.S. PATENT DOCUMENTS

| | | | |
|---|---|---|---|
| 3,340,186 | 9/1967 | Weyl | 203/10 |
| 3,440,146 | 4/1969 | Louw | 203/DIG. 17 |
| 3,454,470 | 7/1969 | Guarino | 159/DIG. 27 |
| 3,454,471 | 7/1969 | Kehoe | 203/DIG. 17 |
| 3,563,860 | 2/1971 | Henderckx | 159/DIG. 28 |
| 3,878,054 | 4/1975 | Rodgers | 159/DIG. 27 |
| 4,316,772 | 2/1982 | Cheng et al. | 202/163 |
| 4,391,676 | 7/1983 | Torberger | 202/236 |
| 4,545,862 | 10/1985 | Gore et al. | 203/25 |
| 4,620,900 | 11/1986 | Kimura et al. | 159/DIG. 27 |

FOREIGN PATENT DOCUMENTS

| | | | |
|---|---|---|---|
| 0167024 | 2/1956 | Australia | 203/DIG. 17 |
| 0040411 | 11/1981 | European Pat. Off. | 203/DIG. 17 |
| 2800612 | 7/1979 | Fed. Rep. of Germany | 203/DIG. 17 |

OTHER PUBLICATIONS

Findley, "Vaporization Through Porous Membranes", May 15-18, 1966, pp. 129-131.

Primary Examiner—S. Leon Bashore
Assistant Examiner—V. Manoharan
Attorney, Agent, or Firm—Silverman, Cass, Singer & Winburn, Ltd.

[57] ABSTRACT

An apparatus for desalinating sea water, comprising a distillation unit which includes a porous hydrophobic membrane which is pervious to steam but impervious to water, and a condensation surface arranged at a distance from the membrane, the distillation arrangement also including a first unit for heating and conducting the water to be distilled on one side of the membrane, and a second unit arranged to conduct a liquid which is colder than the water, on the side of the condensation surface remote from the membrane, distilled water being collected and drawn-off between the membrane and the condensation surface.

The apparatus is characterized in that the first unit incorporates a closed pipe loop (11',12,13) which is connected in series with the warm side (10) of the distillation unit (1); in that the second unit incorporates a closed pipe loop (14,15,16) which is connected in series with the cold side (11) of the distillation unit (1); in that a drainage valve (17) is provided for drawing-off water from the pipe loop (11,12,13), of the first unit; in that there is provided a water filling valve (20) and a pipe line (23) for drawing water from the pipe loop (14,15,16) of the second unit; in that the pipe loops of respective first and second units are connected together by means of a connecting line (25); and in that a heat exchanger (50) is connected to the pipe loop (11,12,13) of the first unit for supplying energy to the water present in the pipe loop of the first unit.

7 Claims, 1 Drawing Figure

APPARATUS FOR DESALINATING SALT WATER BY MEMBRANE DISTILLATION

The present invention relates to an apparatus for desalinating salt water by membrane distillation.

Apparatus utilizing membrane distillation are known to the art, inter alia from the Swedish patent specification No. 419 699. The Swedish patent specification describes an apparatus for membrane distillation comprising a plurality of first cassettes for conducting warm salt water and a plurality of second cassettes for conducting a cold liquid, such as cold sea water. Located between each pair of mutually adjacent cassettes is a separation cassette which separates one of the first cassettes from one of the second cassettes.

The separation cassette according to the aforesaid patent specification includes a hydrophobic porous membrane which constitutes one side surface of the cassette, and a thin plastics film which constitutes the other side surface of the cassette, the membrane being spaced from the plastic film so as to form an air gap between the membrane and the film. Warm salt water flows towards the membrane from the side thereof remote from the air gap and enters one of the first cassettes, whereas cold water flows into one of the second cassettes on the side of the plastic film remote from said air gap.

Distillation is effected in a manner such that the hot or warm salt water gives off water vapor which passes through the pores of the membrane and through said air gap, whereafter the water vapor condenses on the cold plastic film. The pores should be of a size which prevents liquid water from passing therethrough.

Such a distillation process affords a number of advantages; for example the process takes place at a temperature beneath the boiling point of water and approximately at atmospheric pressure, which enables a non-corrosive construction material to be used. In addition, such a process is relatively highly productive in relation to the size of the cassettes and the numbers thereof.

However, the process is encumbered with one serious disadvantage. This disadvantage is based on the fact that large quantities of energy are transported from the hot salt water on the evaporation side to the cold water on the condensation side for each product water-unit desalinated.

This energy transport results in a lowering of the temperature of the hot water flow and a corresponding increase in temperature of the cold water flow. Lowering of the temperature in the hot water flow and also the decrease in the temperature gap between the hot and the cold flow decreases the production of fresh water. In order to maintain an acceptable level of productivity, it is necessary to restrict these changes in temperature. This can only be achieved by increasing the flows of heated salt water and cold water respectively through the desalinating unit.

This means that large quantities of salt water must be heated. In addition, large quantities of cooling water must be pumped through the distillation unit.

In order for such a process to function satisfactorily the water supplied to the process must be pre-treated by filtration and chemical treatment. Thus, the use of large quantities of water necessitates expensive heating and expensive treatment processes.

The present invention solves this problem, so that solely minor quantities of cold sea water supplied to the system need be heated and minor quantities of cold salt water need be supplied for cooling purposes, at the same time as a significant part of the energy transferred from the hot salt water to the cold salt water is recovered.

The invention also enables the process to be readily controlled.

Thus, the present invention relates to an apparatus for desalinating salt water, comprising a distillation unit which includes a porous, hydrophobic membrane which is pervious to steam or water vapor but is impervious to water, and a condensation surface arranged at a distance from the membrane, said distillation unit further comprising a first unit for heating water to be distilled and conducting said water on one side of the membrane, and a second unit arranged to conduct a liquid, which is colder than said water, on the side of the condensation surface remote from the membrane, distilled water being collected and drawn off between said membrane and said condensation surface, the invention being characterized in that said first unit includes a closed pipe loop which is connected in series with the warm side of the distillation unit; in that said second unit includes a closed pipe loop connected in series with the cold side of the distillation unit; in that there is provided a drainage valve for drawing off water from the loop of the first unit; in that there is also provided a water-filling valve and a pipeline for drawing water from the loop of the second unit; and in that the loops of the first and the second units are connected together by means of a connecting line; and in that a heat exchanger or the like is connected to the loop of the first unit for supplying energy to the water present in said loop.

The invention will now be described in more detail with reference to an exemplifying embodiment thereof illustrated in the accompanying drawing, the single FIGURE of which is a schematic flow diagram of an apparatus according to the invention.

FIG. 1 illustrates schematically and in cross-section a distillation unit 1 which includes the aforesaid cassettes and comprises a porous hydrophobic membrane 2 which is permeable to steam or water vapor but impermeable to liquid, and further comprises a condensation surface in the form of a plastic film 3 located at a distance from the membrane. Located between the membrane 2 and the plastic film 3 is an air gap 4 which incorporates a channel or the like for communication with the atmosphere as illustrated by the arrow 5. Arranged at the lower end of the air gap 4 is a channel 6 or the like for conducting away fresh water-condensate from the air gap, as illustrated by the arrow 7. The membrane 2 and the plastic film 3 may be suspended from any suitable construction.

Arranged on one side of the unit 1 is a first chamber 10 for conducting the liquid to be distilled, as illustrated by the arrow 8, so that the liquid covers the side of the membrane remote from the air gap.

Arranged on the other side of the unit 1 is a second chamber 11 for conducting a liquid which is colder than the liquid to be distilled, as illustrated by the arrow 9, so that the colder liquid covers the side of the plastic film remote from the air gap.

According to the invention the first unit incorporates a closed first pipe loop 11', 12, 13 which is connected in series to the first chamber 10 of the distillation unit. The second unit also incorporates a closed, second pipe loop 14, 15, 16, which is connected in series with the second chamber 11 of the distillation unit.

The illustrated apparatus also includes a drainage valve 17 for drawing water from the pipe loop 11', 12, 13 of the first unit, in the direction shown by the arrows 19. A pipe 18 extends from the closed loop 11', 12, 13 to a drain, via the drainage valve 17.

A filling valve 20 for filling the loop 14, 15, 16 of the second unit with water is mounted on a pipe 21 intended for supplying sea water at normal sea-water temperature in the direction of the arrow 22, the pipe 21 being connected to the pipe loop 14, 15, 16 of the second unit.

Also extending from the pipe loop 14, 15, 16 of the second unit is a pipe 23 for drawing water from the pipe loop of the second unit in the direction shown by the arrow 24.

The pipe loops of the two units are connected together at a location thereon by means of a connecting line 25. When the apparatus is operating, water is transferred intermittently or continuously through the connecting line 25 from the second unit to the first unit, as illustrated by the broken arrow 26. The arrows 8, 27 illustrated the flow direction in the first pipe line 11', 12, 13, whereas the arrows 9, 28 illustrate the flow direction in the second pipe loop 14, 15, 16.

Each pipe loop incorporates a respective pump 29, 30 for advancing the water through respective loops. A pump 31 is provided for pumping sea water into the second pipe loop, via the pipe 21.

The distilled water produced is carried away through a pipe 32, to a collecting vessel 33 or to a consumer.

Each distillation apparatus normally comprises a very large number of distillation units 1 connected together in parallel, although only one such unit has been shown in FIG. 1 for the sake of clarity.

As will be understood, the volumetric capacity of the collecting vessel 33 in relation to the distillation unit 1 is much greater than that illustrated in the FIGURE.

In the FIG. 1 the reference 34 identifies the surface of the sea, although it will be understood that the apparatus can be placed at some other location other than in the immediate proximity of the sea water.

According to the invention the drainage valve 17 is controlled by means of a control device 35, via an electric conductor 36. The valve 17 is suitably a magnetic valve, i.e. a valve controlled by an electromagnetic device 37. The control device 35 is arranged to control the valve 17 in response to a signal emanating from a transducer 38 in the form of a salinometer of a kind known per se. The signal is relayed on an electric conductor 57. This signal constitutes a real-value signal. The control device 35 incorporates a setting means 39, for example in the form of a potentiometer, for setting a control value, or a control value interval.

When the water present in the first loop 11', 12, 13 is distilled, steam is transported through the membrane 2, causing the salt content in the loop to rise. In conjunction herewith the control device 35 receives a signal from the salinometer 38, indicating an increase in salt content. The control device 35 is arranged herewith to cause the drainage valve 17 to open the connection between the first pipe loop and the free atmosphere, in FIG. 1 illustrated by the sea-water surface 34. Introduction of further water is effected from the second pipe loop 14, 15, 16, via the aforementioned connecting line 25, synchronously with draining water through the pipe-line 18. Since the salt content of the water in the second pipe loop is lower than the elevated salt content of the first pipe loop the salt content of the first pipe loop will fall when introducing further water thereinto.

The control device 35 is arranged to close the valve 17 when the salt content has fallen to a predetermined level set through the setting means.

Thus, the first loop is filled solely with water from the second pipe loop, through the single connecting line or pipe 25 between the two loops.

The apparatus as a whole is replenished with water solely through the aforementioned filling valve 20, i.e. to the second pipe loop 14, 15, 16. The filling valve 20 is also controlled by an electromagnetic device 40, i.e. a magnetic valve. The filling valve 20 is controlled by means of a control device 35, which is preferably the same device as that which controls the drainage valve 17, but which may also be a separate control device.

The control device controls the filling valve via an electric conductor 61.

The control device 35 is arranged to control the introduction of water to the second pipe loop 14, 15, 16 in response to a signal transmitted from a temperature sensor 42 over an electric conductor 41, in a manner to maintain a pre-determined temperature in the pipe loop of the second unit.

This signal constitutes a real-value signal. The control device 35 incorporates a setting means 43, for example in the form of a potentiometer, for setting a control value or a control value interval.

In order to obtain effective distillation, it is necessary for a temperature difference to prevail between the two pipe loops of respective units. By filling the apparatus with water through the filling valve 20, either intermittently or continuously, at the same time as the amount of water introduced is substantially less than the flow in the pipe loop 14, 15, 16, a sufficiently low temperature is maintained in the second unit without needing to supply the second unit continuously with large quantities of water. Thus, far less water need be filtered and treated with chemicals than when the quantity of water introduced into the second unit is equal to the flow in the said second unit. A filtering and chemical-treatment stage 44 is illustrated schematically in the FIGURE.

Since a pre-determined lower temperature is to be maintained in the second unit, however, it is necessary for the amount of water introduced via the filling valve to exceed the amount of water transferred to the first pipe loop via the connecting pipe 25, unless a separate cooling device is incorporated in the pipe loop of the second unit. In view of this, the aforesaid pipe 23 is provided for the purpose of taking water from the second pipe loop.

According to one preferred embodiment of the invention, the aforesaid pipe 23 extends via a vessel 45 provided with a spillway 46, from which a pipe 47 extends into the sea or ocean 34.

In accordance with the invention, the volumetric capacity of the vessel 45 is sufficient to replace the volume taken from the first unit at one and the same point in time via the drainage valve 17. In this way it is not necessary to synchronize drawing of water from the first unit with corresponding filling of the second unit with water via the filling valve 20. According to one embodiment, the vessel 45 is provided with a level sensor 48, which is arranged to send a first electric signal to the control device 35 over a conductor 49 when the level of water in the vessel has fallen to a pre-determined value. When this pre-determined level is reached, the control device 35 causes the filling valve 20 to open, and holds the valve in its open mode until the level sensor 48 sends a second signal to the control device 35, this second signal signifying that the level has been restored to a pre-determined level.

According to a further, preferred alternative embodiment, however, the control device 35 is adapted to open the filling valve 20 at the same time as the aforesaid drainage valve 17 is opened, so that water is introduced synchronously into the second unit when water is transferred to the first unit via the connecting pipe 25.

In order to obtain the requisite water temperature in the first unit, the water passes a heat exchanger connected to an energy source 51.

Although the energy source 51 may be any suitable source, it preferably comprises a source of waste heat. For example, the heat source may comprise the cooling water system of a diesel engine used to produce electrical energy for driving the aforesaid pumps and control devices. In those countries which enjoy a warmer climate solar panels may be used, either separately or in combination with a waste-heat source. When there is adequate access to electrical energy, the energy source 51 may comprise a source of electrical energy.

One characteristic of a membrane distillation process according to the aforementioned Swedish patent is that the flow through the membrane 2 greatly increases progressively with increasing temperature of the water to be distilled. In this case, the cooling water in the second unit is assumed to be held at a substantially constant level.

When applied to the present invention, this means that the process becomes self-regulating such that the process itself finds its own working level, due to the fact that the amount of water distilled in the first unit corresponds to the amount of energy supplied, wherewith a corresponding amount of pre-heated water is also supplied to the pipe loop of the first unit from the pipe loop of the second unit, via the connecting pipe. The supply of water to the pipe loop of the second unit for maintaining the aforesaid pre-determined temperature therein is also directly dependent on the amount of water distilled.

By way of example it can be mentioned that when the water in the first unit has a temperature of 80° C. and the water in the second unit is permitted to have a temperature of 60° C., the relationship between the flows in the process is as follows:

Quantity of distilled water via the pipe 32; quantity of water drawn from the second unit via the pipe 23; quantity of water drawn from the first unit via the pipe 18 =1:10:2.

Those energy losses occurring in a process of this kind are primarily due to heat transport through the membrane 2. Owing to the fact that a separate cooling loop is provided, mainly the second pipe loop, a significant part of these energy losses is recovered by heating the water in the loop. Since this water is transferred to the first pipe loop, the first unit is therefore supplied with pre-heated water.

As will be clearly seen from the aforegoing, the present invention solves the aforesaid problems regarding the large quantities of water needing to be filtered, treated with chemicals and heated. In addition, a significant part of the energy transported through the membrane is recovered. The apparatus also finds its own working level in dependence on the energy supplied.

In order to further improve the efficiency of the apparatus and reduce the amount of water which need be supplied, lied, there is provided in accordance with a preferred embodiment a heating arrangement comprising a heat pump 52 of a known kind. The evaporator 53 of the heat pump 52 is connected to the second pipe loop via a heat exchanger, and the condenser 54 of said heat pump is connected to the first pipe loop via a heat exchanger. Thus, energy is transferred via the heat pump from the second unit to the first unit, as illustrated by the arrow 55.

According to a modified embodiment, the heat pump includes a further evaporator 56 connected, via a heat exchanger, to the pipe 6 through which distilled water is removed from the apparatus. This enables part of the heat content of the distilled water to be recovered.

By using a heat pump in the aforedescribed manner, substantially all energy lost from the distillation process is recovered.

The reference numerals 58, 59, 60 in the FIG. 1 identify one-way valves which permit water to flow in solely one direction, from the non-filled side to the filled side of the valve.

In the aforegoing, the invention has been described with reference to one embodiment thereof. It will be understood, however, that modifications can be made to the illustrated embodiment. For example, the illustrated components can be replaced with other components having an equivalent function, and the schematically illustrated coupling diagram of the pipe system illustrated in the FIGURE can be modified without departing from the concept of the invention, namely the arrangement of a first unit in which the warm water flows in a loop, the arrangement of a second unit in which the cold water flows in a loop, and the joining of the loops so that the first unit is filled by taking water from the second unit.

Thus, the present invention is not restricted to the aforedescribed and illustrated embodiment, and modifications can be made within the scope of the following claims.

We claim:

1. An apparatus for desalinating salt water comprising: a distillation unit including a porous hydrophobic membrane which is pervious to steam but impervious to water; a condensation surface located at a distance from the membrane; a first unit for heating and conducting the water to be distilled on one side of the membrane; a second unit arranged to conduct water which is colder than the water to be distilled on the side of the condensation surface; means for drawing-off distilled water between said membrane and said condensation surface; a closed pipe loop (11', 12, 13) which is connected in series with the warm side (10) of the distillation unit (1); a closed pipe loop (14, 15, 16) which is connected in series with the cold side (11) of the distillation unit (1); a drainage valve (17) for drawing water from the pipe loop (11, 12, 13) in the warm side of the distillation unit a filling valve (20) for filling with water in the cold side of the distillation unit; a pipe line (23) for drawing water from the pipe loop (14, 15, 16) of the second unit; a connecting line (25) connecting the respective pipe loops of the first and the second units; and a heat exchanger (50) connected to the pipe loop (11', 12, 13) of the first unit for supplying energy to the water present in the pipe loop of the first unit.

2. Apparatus according to claim wherein, the drainage valve (17) is controlled by means of a control device (35) arranged to control the withdrawal of water in response to a signal from a salinometer (38) incorporated in the pipe loop (11', 12, 13) of the first unit, so as to maintain a pre-determined salt content in the pipe loop (11', 12, 13) of the first unit.

3. Apparatus according to claim 2, wherein the filling valve (20) is controlled by means of a control device (35) arranged to control a filling operation in response to a signal from a temperature sensor (42) to maintain a pre-determined temperature in the pipe loop (14, 15, 16) of the second unit.

4. Apparatus according to claim 3, wherein said control device (35) includes means such that filling valve (20) is opened at the same time as the drainage valve (17) is opened.

5. Apparatus according to claim 1, wherein the pipe line (23) of the second unit is connected to a vessel (45) provided with a spillway (46).

6. Apparatus according to claim 1, wherein the first unit further includes heating means which comprises a heat pump (52), the evaporator (53) of which is connected to the pipe loop (14, 15, 16) of the second unit, and the condenser (54) of which is connected to the pipe loop (11', 12, 13) of the first unit.

7. Apparatus according to claim 6, wherein the heat pump (52) includes a further evaporator (56) which is connected to a pipe (6) for drawing-off distilled water.

* * * * *